United States Patent

Jenkin

[15] 3,639,791

[45] Feb. 1, 1972

[54] HYDROSTATIC AIR BEARING

[72] Inventor: Keith R. Jenkin, Warren, Mich.

[73] Assignee: Speedring Corporation, Warren, Mich.

[22] Filed: Feb. 13, 1970

[21] Appl. No.: 11,106

[52] U.S. Cl. .................................................310/90, 308/9
[51] Int. Cl. .....................................H02k 5/16, F16c 17/04
[58] Field of Search.................................308/DIG. 1, 9, 122

[56] References Cited

UNITED STATES PATENTS

| | | | |
|---|---|---|---|
| 3,461,752 | 8/1969 | Kielas et al. | 308/9 |
| 3,455,155 | 7/1969 | Greenberg et al. | 308/9 |
| 3,160,357 | 12/1964 | Jackson et al. | 308/DIG. 1 |
| 2,670,146 | 2/1954 | Heizer | 308/DIG. 1 |

FOREIGN PATENTS OR APPLICATIONS

| | | | |
|---|---|---|---|
| 726,018 | 3/1965 | Great Britain | 308/DIG. 1 |

*Primary Examiner*—Edgar W. Geoghegan
*Assistant Examiner*—Frank Susko
*Attorney*—Barnard, McGlynn & Reising

[57] ABSTRACT

A laser scanner employing a reflective polyhedron which is rotatably supported relative to a stator shaft by means of a hydrostatic air bearing. The bearing is constructed to provide at least two axially spaced sets of high-pressure ports and exhaust passages on opposite sides of the ports and including an exhaust passage centrally between the sets of ports so as to effectively decouple the high-pressure regions in the vicinity of the ports and effectively divide the bearing into two portions each of which attains optimum compliance by having an effective length-to-diameter ratio of one.

14 Claims, 4 Drawing Figures

INVENTOR.
Keith R. Jenkin
BY
Barnard, McGlynn & Reising
ATTORNEYS

HYDROSTATIC AIR BEARING

This invention relates to hydrostatic bearings of the type providing support between two relatively rotatable members.

It is well understood that two relatively displaceable members may be supported in spaced relation by means of a fluid pressure bearing. A bearing wherein the fluid pressure is developed by the relative displacement between the two members is called a hydrodynamic bearing and is commonly used to support rotative bodies such as gyroscopic rotors. A bearing wherein the fluid pressure is supplied by means of an external source and is directed to the bearing clearance by means of passages and the like is called a hydrostatic bearing. The present invention relates to bearings of the latter class.

It is well understood that in a fluid bearing for supporting coaxial and relatively rotatable members the load carrying capability of the bearing depends upon the projected bearing area. In a cylindrical bearing, this area is defined as the bearing length multiplied by the effective diameter of the cylindrical bearing clearance. Moreover, the optimum bearing stiffness is achieved when the ratio of the axial bearing clearance length to the clearance diameter is approximately unity. Therefore, to increase load-bearing capability without sacrificing stiffness qualities it is necessary in prior art bearings to increase both bearing diameter and length. This results in increased windage losses in the bearing with the consequent and objectionable requirement for additional power in the rotative drive for the bearing members. Since rotating losses may increase as an exponential function of bearing diameter, it is very often the case that a bearing load limit is quickly imposed by the acceptable bearing size. Accordingly, a trade-off or compromise between the load-carrying capability, compliance, and power requirements must usually be made.

It will be noted that throughout the specification the terms "bearing stiffness" and "bearing compliance" are used interchangeably, it being assumed that those of ordinary skill in the art will recognize that compliance is the reciprocal of stiffness.

In accordance with the present invention the load carrying capability of a hydrostatic bearing may be significantly increased without a proportional increase in bearing diameter and without sacrificing compliance qualities by disturbing the desired bearing length-to-diameter ratio. In general, this is accomplished by establishing in a bearing clearance between two coaxial members of a bearing assembly, two or more axially spaced high-pressure regions, each high-pressure region being bounded by a low-pressure region. In addition, a low-pressure region is caused to occur between each spaced pair of high-pressure regions. This intermediate low-pressure region effectively decouples the high-pressure regions and defines at least two axially spaced lands each of which is subject to individual length-to-diameter compliance determination. Therefore, the load-carrying capability of a bearing assembly of given length may be increased by factors of two or more without increasing the diameters of bearing assembly components.

In the specific embodiment the bearing assembly includes an outer bearing member and an inner bearing member, the two members being coaxially mounted for relative rotation. The inner bearing member is provided with an internal passage for connection to a source of fluid under pressure and at least two axially spaced sets of radial holes. These holes communicate with the bearing clearance between the inner and outer members to define the high-pressure regions in the bearing clearance. The assembly further includes pressure relief means, such as grooves and passages to provide the low-pressure regions. Again, one of these means which may, for example, include a groove and an exhaust passage communicating therewith, is disposed between these sets of holes to decouple the high-pressure regions. The land adjacent each high-pressure region may be designed so as to exhibit a desired length-to-diameter ratio and thereby to provide the desired bearing stiffness qualities. Two, three, or more of such spaced lands may be provided in any given bearing.

In the preferred form the holes which extend between the internal passage of the inner member and the bearing clearance to define the high-pressure regions are uniformly and circumferentially disposed about the inner member. Moreover, the holes of one set are circumferentially offset from the holes of another set to prevent a condition known as bearing lockup wherein a radial displacement of the supported member relative to the support member causes a closure or near closure of holes on one side of the bearing with the resulting localized loss of fluid pressure.

The various and features and advantages of the subject invention will be best understood by reference to the following specification which describes an illustrative embodiment of the invention. This specification is to be taken with the accompanying drawings of which:

Figure 1:
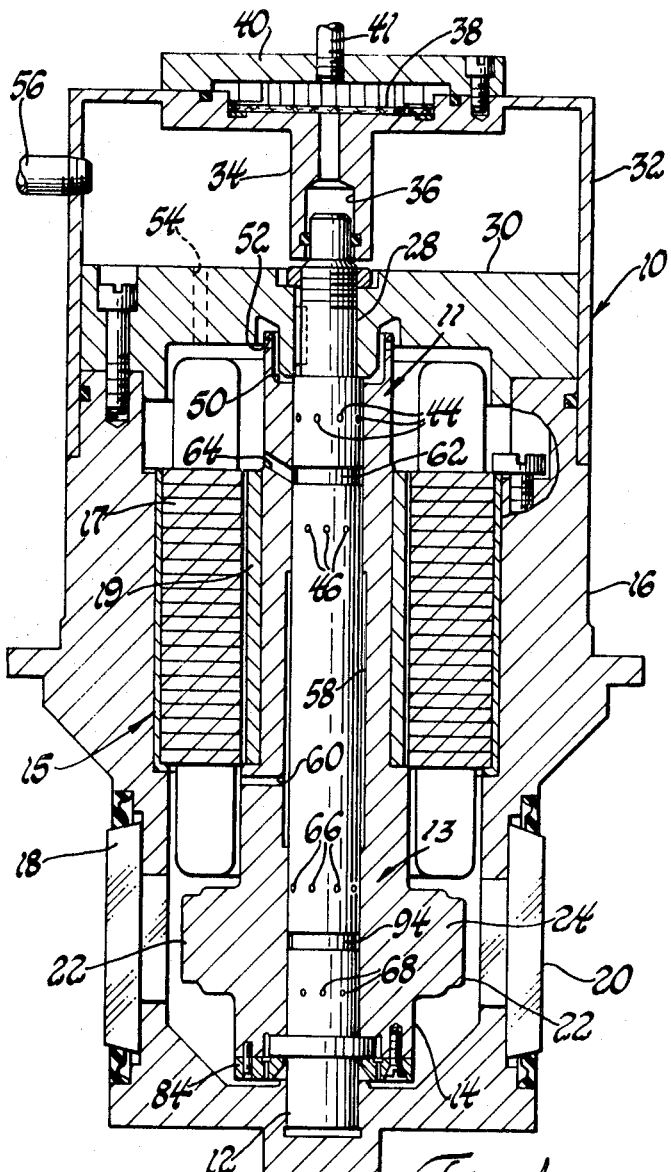
FIG. 1 is a cross-sectional view of a laser scanner employing a rotor which is supported by a bearing constructed in accordance with the present invention.

Referring to FIG. 1 there is shown a laser scanner 10 having relatively rotatable assembly which includes a hydrostatic air bearing. The assembly includes a first member in the form of a stator shaft 12 and a second member in the form of a rotor 14 which surrounds stator shaft 12 for rotation about a common axis which is also the longitudinal axis of symmetry of a housing 16. The laser scanner 10 is employed to angularly deflect optical beams such as those produced by lasers and, accordingly, the housing 16 is provided with diametrically oppositely disposed windows 18 and 20 which are suitably set in place and sealed relative to the housing 16. Windows 18 and 20 provide optical access from the exterior of the housing 16 to a set of contiguous flats 22 on the peripheral surface of an enlarged polygonal portion 24 of the rotor 14.

Rotor 14 is supported for rotation about the stator shaft 12 by axially spaced hydrostatic bearings 11 and 13. Each of the bearings 11 and 13 is designed in accordance with the present invention to be of a composite character, the individual areas of which each exhibit an optimum length to diameter ratio for optimum stiffness.

Rotation of the rotor 14 is accomplished by means of a hysteresis motor 15 of the type including a fixed stator winding 17 and a radially spaced hysteresis ring 19 which is secured to the rotor 14 for rotation therewith, Hysteresis motors are well known and commercially available and, therefore, no detailed description of the motor 15 is given.

Referring now to FIG. 1 through 4, the stator shaft 12 is of generally elongated cylindrical configuration and is preferably fabricated from a dimensionally stable and machinable material, such as beryllium. Stator shaft 12 has formed therein an axially extending internal passage 26 which is adapted to be connected to a source of air under pressure thereby to feed the hydrostatic bearings 11 and 13. Of course, fluids other than air may be employed in the hydrostatic bearings 11 and 13 as will be readily apparent to those skilled in the art. Shaft 12 has at the upper end, as shown in FIG. 1, a threaded section 28 of reduced diameter which extends through a cap portion 30 which in turn is secured to the housing 16. An aluminum cover 32 is disposed over the outer periphery of the cap 30 and over a recessed peripheral portion of housing 16, as shown in FIG. 1. Cover 32 may be suitably brazed in place. The section 28 of stator shaft 12 extends into a centered and axially extended portion 34 of the cover 32 which portion is bored out to form an opening 36. Opening 36 communicates with an input conduit 41 through a filter 38. A cover member 40 is disposed over the filter 38 to maintain it in place. Conduit 41 is connected to a source of air under pressure, not shown.

Figure 2:
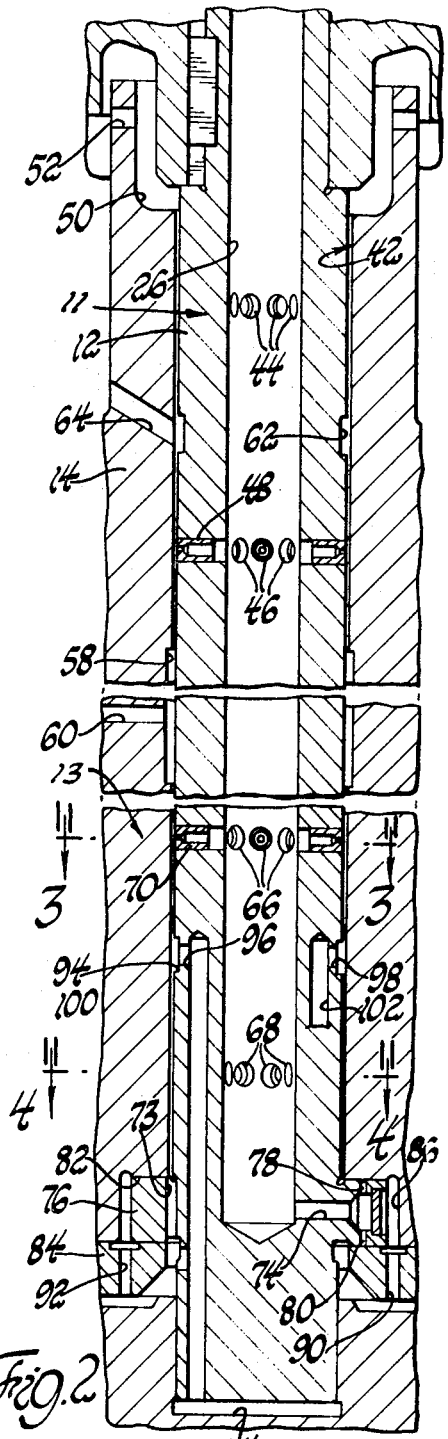
FIG. 2 is an enlarged view of certain details in the assembly of FIG. 1.

As best shown in FIG. 2, the maximum external diameter of the stator shaft 12 is slightly less than the minimum internal diameter of the rotor 14 so as to define a bearing clearance 42 of generally annular configuration. The clearance 42 is periodically interrupted by relief grooves for purposes to be described. The high-pressure air which is introduced into the internal passage 26 of the stator shaft 12 is permitted to flow from the passage 26 to the clearance 42 through axially spaced sets of holes 44 and 46 in the bearing 11 as well as through holes 66 and 68 in the bearing 13. The holes 44, 46, 66, and 68 are uniformly circumferentially distributed and extend radially through the walls of the stator shaft 12.

Referring now specifically to bearing 11, inserts 48 having through bores of substantially reduced cross section are placed into the holes 44 and 46 as illustrated only with respect to the holes 46 in FIG. 2. Accordingly, axially spaced high-pressure regions are produced in the clearance 42 in the vicinity of the holes 44 and 46. These high-pressure regions tend to support the rotor 14 relative to the stator shaft 12 and the housing 16 thus to permit free and substantially contactless rotation of the rotor 14 by the hysteresis motor 15.

Low-pressure regions are provided on axially opposite sides of the holes 44 and 46. The low-pressure region to the upper side of the holes 44, as shown in FIG. 2, is provided by means of an annular exhaust passage 50 which extends through the rotor member 14 and which has a radial extension 52 for permitting the flow of air into the volume in the vicinity of the hysteresis motor winding 17. This volume is communicated by means of a passage 54 extending through the cap 30 into the volume between the cap 30 and the upper end wall of the cover 10 as shown in FIG. 1. A master exhaust conduit 56 is provided through the wall of the cover 10 to return the exhausted air to a high pressure source, not shown.

The low-pressure region bounding the downward side of the holes 46, as seen in FIG. 2, is established by means of a relatively long, but shallow, axially extending cylindrical recess 58 in the inner wall of the rotor 14. Recess 58 is in fluid communication with the radially extending exhaust passage 60 which again flows into the space around the hysteresis motor 15 and is thus evacuated by means of the master exhaust conduit 56 through the passage 54, as previously described.

To decouple the high-pressure land regions inwardly of the holes 44 and 46, a relief groove 62 is provided in the outer diameter of the stator shaft 12 centrally between the holes 44 and 46. Moreover, groove 62 is in fluid communication with a radially skewed passage 64 which extends into the space in the vicinity of the hysteresis motor 15. This groove and passage combination 62, 64 establishes a low-pressure region between the holes 44 and 46 and defines a first land bearing 11 whose length is bounded on one side by the exhaust passage 50 and on the other side by the groove 62. A second land in bearing 11 is also defined and is bounded by one side by the exhaust groove 62 and on the other side by the relief recess 58. Both of these lands in bearing 11 achieve optimum compliance by design and spacing of the various holes and ports and grooves such that the length of the lands, as just described, is approximately equal to the effective diameter of the stator shaft 12 in an ungrooved area. Accordingly, the length-to-diameter ratio of each land in bearing 11 is substantially unity.

Figures 3, 4:
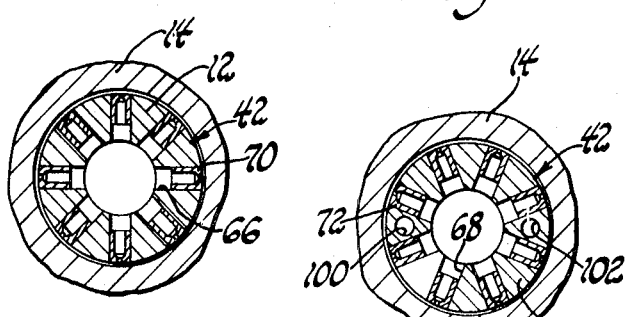
FIG. 3 is an end view taken along a section line 3—3 of FIG. 2.
FIG. 4 is another end view taken along a section line 4—4 of FIG. 2.

Referring now specifically to bearing 13, it will be seen that it is constructed to be similar in effect to bearing 11. Inserts 70 are placed in the holes 66 to reduce the effective cross-sectional area of the holes as shown in FIG. 3. Similarly, inserts 72 are disposed in the holes 68, as shown in FIG. 4, to reduce the cross-sectional area of the passages between the internal passage 26 of the stator shaft 12 and the clearance 42. The holes 66 and 68 thus produce axially spaced high-pressure regions in the clearance 42 to support the rotor 14 relative to the stator shaft 12. Again, the lands in bearing 13 are bounded by low-pressure regions on axially opposite sides thereof. The elongated recess 58 in the rotor 14 defines one boundary of the land associated with holes 66 and thus establishes the first low-pressure boundary region. A low-pressure region axially outwardly from the holes 68 is established by means of an axial passage 73 which extends through a thrust plate portion 76 of abruptly increased diameter on the stator shaft 12. A radially extending passage 74 is also formed in thrust plate 76 and branches into oppositely axially extending portions 78 and 80 which terminate at the axially opposite faces of the thrust plate 76 as best shown in FIG. 2. Rotor 14 is contoured in the vicinity of the thrust plate 76 so as to provide a radial step 82 which faces one of the radial surfaces of the thrust plate 76. The mating or facing surface for the other face of the thrust plate 76 is provided by means of a cap member 84 which is secured to the rotor 14 by means of screws or other suitable fasteners, as best shown in FIG. 1. Accordingly, the passage 74 supplies air to the axially opposite radial faces of the thrust plate 76.

Air which is propelled to the radially outermost boundary of the thrust plate 76 is exhausted through a passage defined by an annular space 86 in the rotor 14 and by a series of contiguous passages 90 and 92 in the cap member 84. The passages 90 and 92 in the cap member 84 again empty into the space between the rotor 14 and the inside of the housing 16 and are thus evacuated through the master conduit 56.

The bearing lands which are fed high-pressure air through holes 66 and 68 are effectively decoupled from one another by a low-pressure region produced by an annular groove 94 in the outer diameter of the stator shaft 12 and a pair of radially inwardly extending passages 96 and 98 which communicate the groove 94 with a pair of axially extending passages 100 and 102 in the stator shaft 12. As shown in FIG. 2, axially extending passages 100 and 102 communicate with radial passages 88 in stator shaft 12 to empty into the space between stator shaft 12 and the bevelled surface in cap member 84. Passages 100 and 102 extend into a clearance 104 between the end of the shaft 12 and the end bell portion of housing 16 as a result of the boring thereof.

Considering further the lands fed by the holes 66 and 68 of FIG. 2, the first land has a length which extends from the relief groove 58 axially along the stator shaft 12 to the groove 94. The length of this land is again selected to be approximately equal to the diameter of the stator shaft in that area. The second land has a length which extends from the central groove 94 to the enlarged annular opening 73 in the thrust plate 76 of the stator shaft 12. Again, this length is selected so that the ratio of the length of the land to the diameter of the stator shaft 12 in that area is approximately unity.

In operation, the conduit 41 is connected to a source of air under pressure such that air is pumped or otherwise positively displaced into the internal passage 26 of the stator shaft 12. From the passage 26 the air is caused to flow radially outwardly through holes 44 and 46 of bearing 11 as well as through holes 66 and 68 of bearing 13. This radially outward flow produces four discrete high-pressure bands in the clearance 42 between the stator shaft 12 and the rotor member 14. In addition, the high-pressure air flows through the passage 74 and through the axial branch passages 78 and 80 to the opposite sides of the thrust plate portion 76. Accordingly, the journal bearings 11 and 13 support the rotor 14 in the radial direction and the thrust bearing defined by plate 76 supports the rotor 12 in the axial direction. The journal bearings 11 and 13 and the thrust bearing are all fed by way of passage 26. Alternating current is applied to the winding 17 of the hysteresis motor 15 to induce a magnetic pattern in the hysteresis ring 19. As the magnetic field in the winding 17 rotates in the circumferential direction, the hysteresis ring 17 is propelled therewith, to rotate the rotor 14 about the stator shaft 12.

During rotation of the rotor 14 an optical signal, such as a light beam from a laser, may be directed through each of the windows 18 and 20 whereupon such beam will be reflected by the reflective flats 22 on the increased diameter portion 24 of the rotor 14. The rotation of the rotor will cause these reflections to be displaced through an angle thus creating the scanning action of the scanner 10.

In summary, it will be seen that the rotor 14 is supported for rotation about the elongated shaft 12 by means of bearings 11 and 13, each of which has substantially twice the load carrying capacity of the ordinary bearing of the given diameter. The lands of each bearing 11 and 13 are of a length equal to the diameter of the stator shaft 12 thus to maintain optimum bearing stiffness while increasing the load carrying capacity and minimizing the bearing diameter.

It is to be understood that the foregoing description relates to an illustrative embodiment of the invention and is not to be construed in a limiting sense.

The embodiments of the invention in which an exclusive property or privilege is claimed are defined as follows:

1. Hydrostatic bearing apparatus comprising: a first bearing member, a second bearing member disposed coaxially of the first member and radially spaced therefrom to define an annular clearance, the first member having formed therein an internal passage for connection to a source of fluid under pressure, first and second axially spaced sets of radial outlets in the first member between the passage and the clearance to produce bands of maximum pressure conditions in the clearance, the clearance immediately surrounding said outlets being of a minimum radial dimension such that the maximum pressure conditions occur in the areas immediately surrounding said sets of outlets, first and second pressure relief means on axially opposite sides of the outlets to produce bands of minimum pressure conditions in the clearance, and a pressure relief groove of greater than minimum radial dimension disposed between the outlets to produce a band of minimum pressure condition in the clearance whereby said clearance contains a pair of axially space high-pressure lands each bounded by low-pressure bands, the axial length of each of the lands being at least approximately equal to the diameter of the clearance.

2. Apparatus as defined in claim 1 wherein each of the sets of outlets comprises a coplanar and circumferentially uniformally arranged plurality of holes in the first member.

3. Apparatus as defined in claim 2 wherein the holes of the first set are circumferentially offset from the holes in the second set.

4. Apparatus as defined in claim 3 including inserts of reduced outlet area disposed in each of the holes of the first and second sets of outlets.

5. Apparatus as defined in claim 1 wherein the groove is in the first member, and an exhaust passage extends through the second member and communicates with the groove.

6. Apparatus as defined in claim 1 wherein the groove is in the first member, and an exhaust passage through the first member and communicating with the groove.

7. Apparatus as defined in claim 1 wherein each of the first and second pressure relief means include fluid exhaust passages formed in the second member and communicating with the clearance to exhaust fluid therefrom.

8. Apparatus as defined in claim 1 including a thrust plate having axially opposite faces and being mounted on the first member for axial stabilization of the first member relative to the second.

9. Apparatus as defined in claim 8 including at least one outlet extending between the passage and the axially opposite faces of the thrust plate.

10. Apparatus as defined in claim 1 including means for rotating the second member relative to the first member.

11. Apparatus as defined in claim 10 including a housing, the first member being affixed to the housing such that rotation of the second member occurs relative to the housing.

12. Apparatus as defined in claim 11 wherein the means for rotating includes a hysteresis motor having a stator winding on the housing and a hysteresis ring on the second member and rotatably therewith.

13. Apparatus as defined in claim 11 including optical reflector means on the second member for reflecting optical signals directed radially thereto, and means in the housing for affording optical signal access to the reflector means.

14. Apparatus as defined in claim 13 wherein the reflector means includes a plurality of contiguous flat faces on the second member.

* * * * *